(12) United States Patent
Dailey et al.

(10) Patent No.: US 7,684,915 B1
(45) Date of Patent: Mar. 23, 2010

(54) CONTROLLED ACCESS FOR LIGHT DUTY MOTOR VEHICLE

(75) Inventors: Joseph Charles Dailey, Phoenix, AZ (US); Roger Edward Desmarais, Jr., Mesa, AZ (US)

(73) Assignee: Vantage Mobility International, LLC, Phoenix, AZ (US)

( * ) Notice: Subject to any disclaimer, the term of this patent is extended or adjusted under 35 U.S.C. 154(b) by 876 days.

(21) Appl. No.: 11/485,130

(22) Filed: Jul. 12, 2006

(51) Int. Cl.
*B60P 1/43* (2006.01)
(52) U.S. Cl. .................. 701/49; 414/462; 414/921
(58) Field of Classification Search .............. None
See application file for complete search history.

(56) References Cited

U.S. PATENT DOCUMENTS

| | | | |
|---|---|---|---|
| 6,825,628 B2 * | 11/2004 | Heigl et al. ........... | 318/468 |
| 6,928,694 B2 * | 8/2005 | Breed et al. ........... | 16/82 |
| 7,091,825 B2 * | 8/2006 | Sahai ................... | 340/5.72 |
| 7,417,396 B2 * | 8/2008 | Yoshida et al. ........ | 318/466 |
| 2003/0193390 A1 * | 10/2003 | Muramatsu ........... | 340/426.13 |
| 2007/0086879 A1 * | 4/2007 | Goodrich et al. ...... | 414/537 |

* cited by examiner

*Primary Examiner*—Michael J. Zanelli
(74) *Attorney, Agent, or Firm*—Paul F. Wille

(57) ABSTRACT

A control module operates a ramp in coordination with a powered sliding door. The control module couples to the OEM network and includes at least one microprocessor, a connector array coupled to at least one microprocessor, and interface circuitry. The microprocessor produces data sequences to keep the network busy, thereby preventing other modules on the OEM network from entering a low power mode. The connector array is adapted to receive daughter boards, plugs, plug-in modules, or wire jumpers for patches. The control module includes a display and a microprocessor is programmed to diagnose the operation of the ramp and provide the results of the diagnosis on the display.

16 Claims, 2 Drawing Sheets

CONTROLLED ACCESS FOR LIGHT DUTY MOTOR VEHICLE

BACKGROUND OF THE INVENTION

This invention relates to a controller for a ramp added to a light duty motor vehicle such as a van, minivan, or sport utility vehicle.

A variety of small motorized scooters have been developed to carry a seated person through areas intended for pedestrian traffic. These scooters are battery powered, ride on either three or four small wheels, and are relatively compact but can be rather heavy because of the battery and electric motor. Powered wheelchairs and scooters are evolving toward each other, making terminology imprecise. One manufacturer avoids the problem and calls its product a "highly maneuverable vehicle." Some vehicles have wheels at the corners of a rectangle with the driven axle parallel to one side of the rectangle. Other vehicles have wheels at the corners of a diamond, with the driven axle parallel to a diagonal of the diamond. As used herein, "scooter" is intended to be generic to all such vehicles for aiding a person of limited mobility.

Ramp mechanisms are either external or internal to a vehicle. External ramps typically fit under the chassis and are used with vans and larger vehicles. An internal ramp is typically somewhat smaller, fits within the vehicle, and requires a substantial re-working of the body of the vehicle. Physically locating a ramp in an unobtrusive manner is only part of the problem. Vehicles, especially minivans, are becoming extremely sophisticated products yet, outwardly, seem little changed to the average motorist. Underneath the sheet metal is not just a computer but a computer network controlling all aspects of operation; e.g. see U.S. Pat. No. 6,785,595 (Kominami et al.). Actually, there are typically several networks, each with more than one computer, that are relatively separate for safety reasons. For example, the cabin is typically one network, the airbag system another network, and the engine compartment another network. Each network bristles with sensors and actuators.

For the aftermarket installer of ramps for scooters, deciding which wire to cut, if any, is a nightmare. Worse, even from a given manufacturer, the wiring can change from year to year without notice. Worse still, some aspects of the wiring are not disclosed by the manufacturer to avoid claims for liability in the event of a problem. Thus, the problem of coordinating the movements of a powered ramp and an OEM (original equipment manufacturer) powered sliding door can be formidable. Even if solved for a given year and model, the solution may go out of date with model changes. It is desired to have a module that is not only suitable for more than one year but also to be suitable for the minivans from more than one manufacturer.

U.S. Pat. No. 5,308,214 (Crain et al.) discloses an OEM vehicle with an internal wheelchair lift positioned next to a powered sliding door on the side of a minivan. The door opens and closes "automatically" but the coordination of the door with the lift appears to come from an operator. Some limit switches are disclosed for interrupting power to operate the lift until the door is in proper position.

In the prior art, several approaches have been taken to modifying minivans that can be classified according to how invasive they are. A very invasive approach is opening a data bus. If the network is interrupted, responsibility for controlling the vehicle is in the hands of the aftermarket manufacturer. Less invasive is coupling into the data bus, somewhat like eavesdropping on a telephone line. Data circulating on a network is not changed, additional data is provided, either to take over the network or to mislead computers on the network.

U.S. Pat. No. 5,396,158 (Long et al.) discloses a control circuit for a power sliding door that senses, among several other events, whether or not the transmission is in park. If the transmission is not in park, an enable signal is changed to prevent the door from operating. One way an aftermarket manufacturer can fool the control circuit is to make the computer think that the transmission is not in the park position, thereby preventing operation of the door when a ramp is extended or retracted. The '158 patent also discloses a delay function that causes the operation of the sliding door to wait for a period of time, during which a door latch mechanism is permitted to operate. The '158 patent also discloses a "sleep" circuit for shutting down the microprocessor to conserve power.

U.S. Pat. No. 5,684,470 (DeLand et al.) discloses a control circuit for a power sliding door in which a delay circuit automatically turns off the control circuit a predetermined period after an event, such as shutting off the ignition. This prevents children from playing with the power sliding door a short time after the event.

U.S. Pat. No. 6,075,460 (Minissale et al.) discloses an implementation of a single wire, serial data bus network meeting the SAE J1850 protocol standard. The patent also discloses a separate line from a first module to a second module that controls a powered sliding door. This separate line carries a "wake-up ground signal" for enabling, or disabling, the second module. Thus, it is known in the art to use control lines separate from the data bus to which several computers are coupled to form a network.

Many circuits, whether integrated or discrete, have "enable" inputs that turn the circuit on or put the circuit into an active mode. "Wake-up", "power up", enable, and the like all mean the same thing: a circuit produces an output appropriate for the input data. "Sleep," "power-down," disable, inhibit, all mean the same thing; with power applied, a circuit produces no output, or change in output, regardless of input data.

U.S. Pat. No. 6,091,162 (Williams, Jr., et al.) discloses a network for controlling a sliding door in which a door control module monitors several operating conditions of the vehicle and makes a determination whether or not to carry out a command to open or close the sliding door. These conditions are in addition to conditions monitored by the module issuing the command. In other words, the intelligence is distributed among the modules on a network. There is no single control module as before. The distributed intelligence only makes worse the problem of which wire to cut. It is also disclosed that commands can be delayed or "staggered" to prevent overload.

All modern vehicles have a sleep mode to reduce power consumption by the control networks, at least when the engine is not running. This sleep mode is both blessing and curse. It can be used to trick the OEM system into not operating the sliding door. On the other hand, the sleep mode has the risk of allowing critical events to be missed because the circuit to which a sensor is connected was asleep. If an event is missed, one or more networks can be affected. Most OEM's include default settings to minimize problems. Unfortunately, a default setting may not be optimum under a particular set of circumstances.

Most digital semiconductive devices are voltage devices. This means that, for a single line bus, zero is not nothing, it is a logic level. Logic can be "positive" or "negative." Positive logic means that a voltage below a first level, near zero, is a logic zero (or "false" or "low") and a voltage above a second level, higher than the first level, is a logic one (or "true" or "high"). Negative logic is the opposite. For buses having two lines, positive logic, negative logic or differential logic signals can be used.

In digital systems, binary data can only represent one of three things: data, an address, or an instruction. This is the information that is carried on a serial data bus or network as used in modern vehicles. The binary data is sent along the serial bus in a format specified by one organization or another. The J1850 standard mentioned above is from the Society of Automotive Engineers (SAE). Control signals are not on the serial bus, at least not directly. Control information can be passed along a network as an instruction to be executed but the wire, the physical bus itself, cannot also be a control line; see the Minissale et al. patent cited above. Conversely, a control line is not a data bus.

U.S. Pat. No. 6,825,628 (Heigl et al.) discloses a modification to a minivan in which a controller is added to a network coupled to an OEM control module and a door control system. In a second embodiment and in a third embodiment, the door control system is disconnected from the network bus and is coupled to the controller by a separate bus. In the second embodiment, the OEM control module controls a system enable line. In the first and third embodiments, the controller is interposed on the enable line between the OEM control module and the door control system. In all embodiments, the controller is interposed between a key control/switch and the OEM controller. Thus, the modification remains somewhat invasive and requires finding the wires from the key control/switch and a suitable place to separate them from the OEM control module.

As used herein, no distinction is made between the terms "microprocessor" and "microcontroller." Similarly, a microprocessor can be a single integrated circuit or a "chip set," having plural integrated circuits. Microprocessors are produced in a variety of capabilities and one of ordinary skill in the art can readily choose an appropriate device. Most manufacturers produce guides for choosing a device.

In view of the foregoing, it is therefore an object of the invention to provide a minimally invasive control system for modifying a minivan to operate an enclosed ramp in coordinated fashion with an OEM powered, sliding door.

Another object of the invention is to provide a module for controlling a sliding ramp, wherein the module did not have to be substantially redesigned for each year, make, and model of vehicle to which the ramp is added.

A further object of the invention is to provide a module for controlling a sliding ramp, wherein the module is compatible with control networks in modern vehicles.

Another object of the invention is to provide a module for controlling a sliding ramp, wherein the module is compatible with non-mechanical entry devices for modern vehicles.

A further object of the invention is to provide a module for controlling a sliding ramp, wherein the module couples into but does not interrupt the serial data bus to which it is coupled.

Another object of the invention is to provide a module for controlling a sliding ramp, wherein the module increases the time that at least certain components are "awake," thereby increasing reliability of the network as m modified for controlling a ramp.

SUMMARY OF THE INVENTION

The foregoing objects are achieved in this invention in which a control module operates a ramp in coordination with a powered sliding door. The control module couples to the OEM network and includes at least one microprocessor, a connector array coupled to at least one microprocessor, and interface circuitry. The microprocessor produces data sequences to keep the network busy, thereby preventing other modules on the OEM network from entering a low power mode. The connector array is adapted to receive daughter boards, plugs, plug-in modules, or wire jumpers for patches. The control module includes a display and a microprocessor is programmed to diagnose the operation of the ramp and provide the results of the diagnosis on the display.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
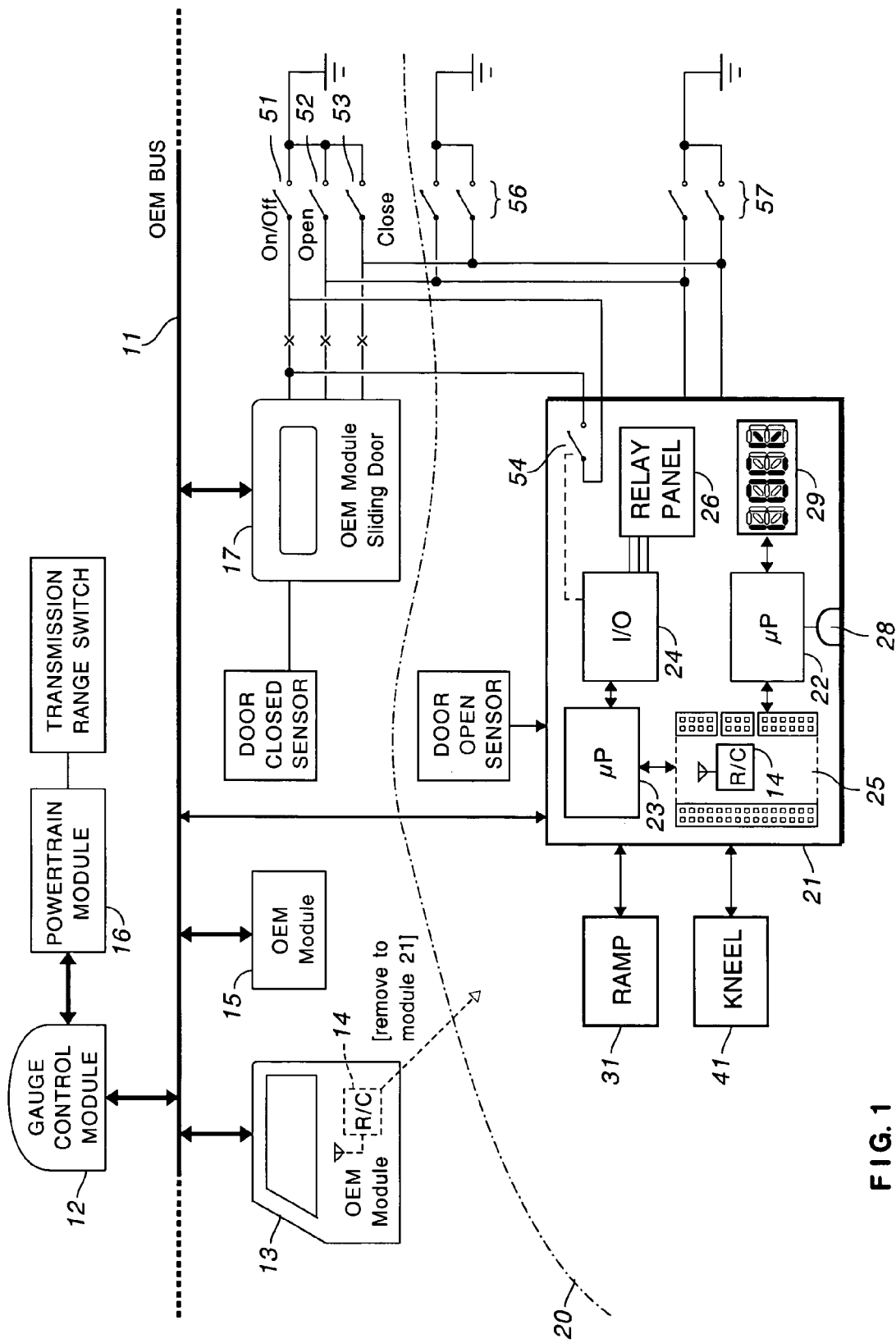
FIG. 1 is a block diagram of a control module constructed in accordance with a preferred embodiment of the invention and coupled to the network in a minivan.

In FIG. 1, bus 11 is a serial data bus as constructed by the manufacturer of the vehicle. In one embodiment of the invention, bus 11 was a "CAN 'B'" bus, which is a higher speed bus than the J1850 bus mentioned in the Minissale et al. patent, identified above. The bus is presently used in Honda vehicles. Bus 11 is located in the cabin of a vehicle, such as a minivan, and typically includes a plurality of modules, such as module 12 for monitoring and controlling the instrument panel and dashboard, module 13 for monitoring and controlling the front doors of the vehicle. In a Honda minivan, one front door includes radio module 14 for receiving signals from a remote control device, sometimes referred to as a remote keyless entry device (not shown). Such devices include buttons for opening or closing doors and opening trunks or rear hatches. Signals from the device are coupled to bus 11 by module 13. There are typically additional modules, such as modules 15 and 17 on bus 11 for monitoring and controlling other aspects of the operation of the vehicle.

Module 17 controls the powered sliding door on the side of the vehicle from which a ramp is to extend. Usually, this is on the right side of the vehicle. Although all the modules have sensors and transducers, those for module 17 are shown in more detail because they relate to the modification of the vehicle to accommodate a ramp.

One aspect of the invention is indicated by dot-dash line 20 which separates the OEM portion of the network from the portions added to the vehicle. Several OEM sensors and transducers are separated from module 17 and coupled to control module 21. This has several advantages. A first is that a sensor cannot cause module 17 to produce a signal on bus 11. This simplifies installation and makes the system somewhat faster because bus signals from module 17 do not have to be intercepted or countermanded by control module 21. This also simplifies coordinating the ramp with the powered sliding door because control module 21 does not have to waste time undoing interference from an OEM module. Control module 21 can couple into bus 11 at any point along the bus, like the other modules. Bus 11 need not be interrupted, which simplifies acceptance, if not approval, by an OEM. Thus, the same module can be useful for several years for more than one brand of vehicle.

In accordance with another aspect of the invention, array 25 of suitable connectors is provided for attaching "daughter" boards to control module 21. Rather than plug in, a daughter board can be coupled to connector array 25 by ribbon cable, flexible circuit, or the like, to permit the daughter board to be parallel with module 21. The daughter boards can be additional memory, I/O, or other devices, or a keypad. For example, array 25 can be used for coupling memory cards to control module 21 to adapt the module to a specific make and model minivan. Array 25 can also be used as a "patch" area to receive jumpers (a primitive form of memory), resistors, or other semiconductor devices such as light emitting diodes (LEDs) to adapt control module 21 to a vehicle. Array 25 also includes a connector for receiving remote receiver 14.

In accordance with another aspect of the invention, control module 21 includes a pair of microprocessors; specifically microprocessors 22 and 23. In general, microprocessor 22 provides interface functions and microprocessor 23 provides control functions. Both microprocessors are coupled to connector array 25 by suitable logic to prevent bus conflict.

Microprocessor 22 is coupled to input-output (I/O) circuit 24, which provides an interface to relay panel 26. Many switching functions in a minivan require switching currents that can be relatively high, at least momentarily because of inductive loads. Relays are more economical and versatile than semiconductor devices in such applications. Some microprocessors have I/O capability but it is preferred to provide external drive because the relays themselves can represent a significant load. Whether mechanical relays or semiconductive switches are used is a design choice.

Ramp module 31 and kneel module 41 represent the sensors, transducers, electronics, motors, and other devices necessary to operate a powered ramp and to perform a "kneel" function, wherein the minivan is lowered to reduce the pitch of the extended ramp. This apparatus is known per se in the art. The purpose of control module 21 is to coordinate the actions of ramp module 31, kneel module 41, and door module 17. The kneel routine may be made optional, e.g. if the ramp is extended over a curb.

Most sensors of interest in the cabin of a vehicle are simple switches for indicating limits of motion or position. (Other, more sophisticated sensors detect the presence of a person in a front seat and can distinguish a person from a package, for example). The switches at the right side of FIG. 1 are normally open, isolated from module 17, and coupled to control module 21.

Switch 51 is a master switch in the sense that it enables or disables module 17. Relay 54 is in series with switch 51, which means that both switches must be closed for module 17 to be operational. It is, in part, by means of switch 51 that control module 21 coordinates the operation of the door, the ramp, and the kneeling operation.

"Open" switch 52 and "close" switch 53 are located with on/off switch 51 in the dashboard. If switch 51 is open, none of the other switches is functional because the ground connection has been interrupted. With switch 51 closed, the other switches are operational but their state is read by control module 21, not module 17. Module 17 is told of the state of the switches by way of bus 11. Switches 56 are located on the "c" pillar of the vehicle and switches 57 are magnetically actuated and located in the taillight assembly of the vehicle.

Control module 21 also includes interface 28 and display 29. Interface 28 can be a Universal Serial Bus (USB) connector, for example. Like the networks in vehicles, such connectors evolve (there is now a "USB2" interface) in both the pinouts and the standards for data on the leads in the connector. Interface 28 couples control module 21 to any computer having the same interface connection. Thus connected, control module 21 to be programmed remotely and to provide diagnostics remotely.

By "remotely" is meant external to the vehicle containing control module 21. Obviously, one could couple to a laptop computer and sit in the vehicle with the computer on ones lap. The connection is much more versatile and can, for example, be used to couple control module 21 to the internet by way of the computer. From the internet connection, a manufacturer can do field tests and, in general, read the condition of the vehicle, as it relates to ramp extension and retraction, detect faults, reprogram an EPROM in connector array 25, cycle the door and ramp, and perform other functions, all without having to disassemble or be near the vehicle. This diagnosis is distinct from and in addition to the diagnosis built into the vehicle by an OEM.

Display 29 is illustrated for simplicity as a multi-segment display. A liquid crystal display (LCD) is preferred. Display 29 need not be on control module 21 itself but is preferably coupled to control module 21 by ribbon cable or other flexible connection. Display 29 can display plural lines of text or display graphics, or both. Display 29 provides a local display that is particularly useful during installation and initial testing of the ramp and powered sliding door. Display 29 also provides a local display if a computer is unavailable.

In accordance with a preferred embodiment of the invention, one of microprocessors 22 and 23 provides the appropriate data signals on bus 11 to maintain bus activity, thereby keeping the system "awake" for a longer time than the system would be awake as programmed by the OEM. Maintaining bus activity enables control module 21 to monitor sensors longer and provide more reliable operation by decreasing the chance that a sensor changes state but the change is not detected by the module. In particular, park, ignition, door latch, and door locks are monitored prior to permitting the system to sleep and prior to putting control module 21 itself asleep.

The basic operation of control module 21 is to open the powered sliding door, extend the ramp or to retract the ramp and close the powered sliding door on command, while monitoring for faults. A fault, such as the transmission not being in park, prevents operation. Other faults can stop operation before completion. Such a fault is repeated depression of a control button. It is preferred to have slight delay, on the order of one second, imposed before repeated commands are followed. This avoids problems with handling a remote or operating a keypad where such repetition in a short time is ignored.

Because some remote controls have a single button for open and close, repeated depression causes operation to stop, then restart in opposite direction. Repeated actuation of a "C" pillar switch or dashboard switch causes operation to stop and then continue because there are separate buttons for open and close. The response is a matter of choice.

Some faults, such as stopping operation before a door is fully closed and then turning off the ignition, will cause the system to maintain bus activity for a predetermined time, then try to complete the operation before shutting down. This gives the operator a chance to intervene but completes the operation if possible. An obstruction, such as a pencil in the doorway, will cause the system to wait, then time out and power down.

Figure 2:
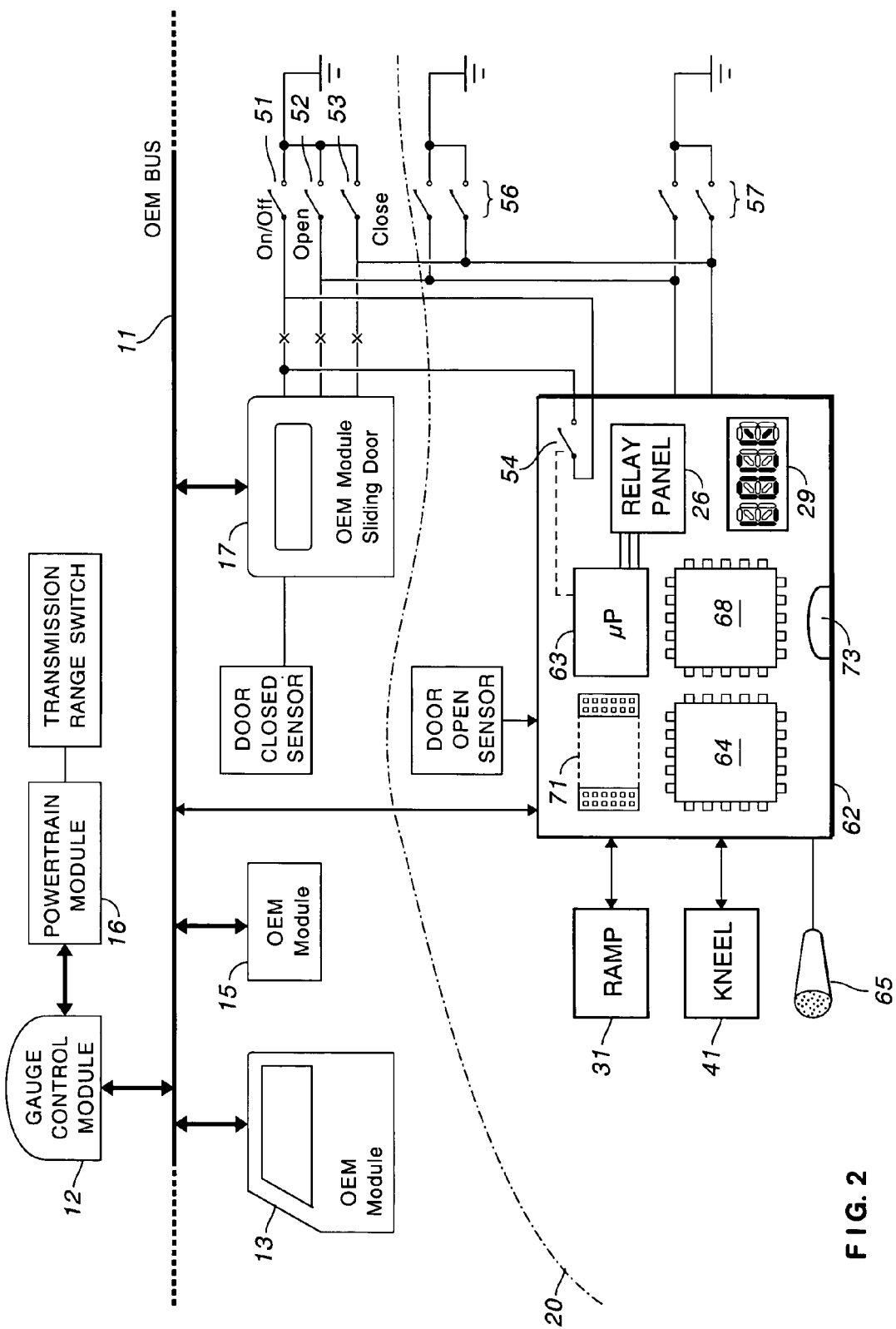
FIG. 2 is a block diagram of a control module constructed in accordance with an alternative embodiment of the invention and coupled to the network in a minivan

FIG. 2 illustrates an alternative embodiment of the invention in which a single microprocessor is used for control and I/O functions. Components identical to those in FIG. 1 have the same reference numeral. Specifically, microprocessor 63 performs the functions of microprocessors 22 and 23 in FIG. 1. In addition, voice detection circuitry 64, coupled to microphone 65, enables voice controlled operation of the door and ramp. Wireless interface 68 provides connection to the internet by way of a wireless network or to a cellular telephone through a "Bluetooth" or other wireless standard. Connector array 71 and interface connector 73 also provided for additional connectivity.

The invention thus provides a minimally invasive control system for modifying a minivan to operate an enclosed ramp in coordinated fashion with a powered, sliding door. The module did not have to be substantially redesigned for each year and model of vehicle to which the ramp is added and is compatible with control networks in modern vehicles. The module is compatible with remote, keyless entry devices for modern vehicles and couples into but does not interrupt the serial data bus to which it is coupled. The module takes control of a powered sliding door by interrupting one control line and initiating bus activity to keep the modules on a network "awake."

Having thus described the invention, it will be apparent to those of skill in the art that various modifications can be made within the scope of the invention. For example, although described in the context of a ramp, the invention can be used for wheelchair lifts of the type disclosed in the Crain et al. patent, cited above. Typically, the van being modified has a powered sliding door. The invention applies to vehicles to which power actuation is added, along with a ramp.

What is claimed as the invention is:

1. In a light duty motor vehicle having an enclosed, protected volume, said vehicle further including a powered sliding door for access to said volume, said door being controlled by a network of modules for operating the vehicle, and a ramp extending through the access provided by the powered sliding door, the improvement comprising:
   a control module for operating said ramp in coordination with said sliding door,
   wherein said control module couples to said network without interrupting said network, and
   wherein the control module includes an array of connectors.

2. The vehicle as set forth in claim 1 wherein said control module includes an interface connector for coupling the control module to a computer.

3. The vehicle as set forth in claim 1 wherein said control module includes an interface circuit for a wireless network.

4. The vehicle as set forth in claim 1 wherein said control module includes a voice actuation circuit and a microphone coupled to said voice actuation circuit.

5. The vehicle as set forth in claim 1 wherein said control module includes an interface circuit to a cellular telephone network.

6. The vehicle as set forth in claim 1 wherein said control module includes at least one microprocessor.

7. The vehicle as set forth in claim 6 wherein said microprocessor is coupled to said array.

8. The vehicle as set forth in claim 6 wherein said control module includes a display and said microprocessor is programmed to diagnose the operation of the ramp and provide the results of the diagnosis on said display.

9. The vehicle as set forth in claim 6 wherein said microprocessor generates a data sequence that keeps said network busy, thereby preventing another module on the network from entering a low power mode.

10. In a light duty motor vehicle having an enclosed, protected volume, said vehicle further including a powered sliding door for access to said volume, said door being controlled by a network of modules for operating the vehicle, and a ramp extending through the access provided by the sliding door, the improvement comprising:
    a control module for operating said ramp in coordination with said sliding door,
    wherein said control module couples into said network without interrupting the network, and
    wherein said control module includes at least one microprocessor.

11. The vehicle as set forth in claim 10 wherein the control module further includes an array of connectors.

12. The vehicle as set forth in claim 11 wherein at least one microprocessor is coupled to said connector array.

13. The vehicle as set forth in claim 10 wherein said microprocessor generates a data sequence that keeps said network busy, thereby preventing another module on the network from entering a low power mode.

14. The vehicle as set forth in claim 10 wherein said control module includes an interface circuit for a wireless network.

15. The vehicle as set forth in claim 10 wherein said control module includes a voice actuation circuit and a microphone coupled to said voice actuation circuit.

16. The vehicle as set forth in claim 10 wherein said control module includes an interface circuit to a cellular telephone network.

* * * * *